United States Patent [19]
Kuritani et al.

[11] Patent Number: 5,432,350
[45] Date of Patent: Jul. 11, 1995

[54] PYROELECTRIC INFRARED DETECTOR WITH AN IMPROVED SENSING ELEMENT

[75] Inventors: Toshiyuki Kuritani; Syuji Takada; Kazutaka Okamoto; Koichi Matsumoto, all of Kyoto, Japan

[73] Assignee: Horiba, Ltd., Kyoto, Japan

[21] Appl. No.: 32,966

[22] Filed: Mar. 18, 1993

[30] Foreign Application Priority Data

Mar. 30, 1992 [JP] Japan .................. 4-103730

[51] Int. Cl.$^6$ .............................................. G01J 5/02
[52] U.S. Cl. .............................................. 250/338.3
[58] Field of Search ................................. 250/338.3

[56] References Cited
FOREIGN PATENT DOCUMENTS 2-24523  1/1990  Japan .................. 250/338.3
2-278131 11/1990 Japan .................. 250/338.3

Primary Examiner—Constantine Hannaher
Attorney, Agent, or Firm—Price, Gess & Ubell

[57] ABSTRACT

A useful pyroelectric infrared detector capable of cancelling noises and detecting dead angles, and accurately detecting a moving direction of a moving body is provided. Four sensing electrodes having an identical shape, area, and sensitivity are formed on a surface of a pyroelectric member in an L-shaped form, so that they are arranged to differ by 90 degrees in phase, respectively, but are symmetric about a center of rotation. The four sensing electrodes form two pairs of dual detecting elements so that output may be provided from the respective first and second dual elements I and II and be appropriately processed.

7 Claims, 11 Drawing Sheets

LEFT TO RIGHT   RIGHT TO LEFT   REAR TO FRONT   FRONT TO REAR

PYROELECTRIC INFRARED DETECTOR WITH AN IMPROVED SENSING ELEMENT

BACKGROUND OF THE INVENTION

1. Field of the Invention

The present invention relates to a dual element-type pyroelectric infrared detector and, more particularly, to an improved configuration of the sensing elements to increase the accuracy of detection and the direction of movement of objects sensed.

2. Description of Related Art

Infrared detectors have been utilized to determine the entrance and presence of persons through the use of a pair of sensing elements. Pyroelectric infrared detectors of this type have been used as burglar alarms or intruder alarms, and are usually arranged in a room to provide a relatively long monitoring distance and the capability of specifying the movement of a person into or out of the room from a specific direction. Reference can be made to FIG. 7(A) to disclose a plan view of a pyroelectric infrared detector of a conventional configuration. The light-receiving elements 32 and 33 have the same rectangular configuration and are mounted on a substrate member 31 for receiving infrared radiation. The specific light-receiving areas are arranged to be symmetric about a point and relatively close to each other to form a dual element. FIG. 7(B) shows a schematic electric circuit for processing signals from such a dual element detector. A high megohm load resistance 34 is used to regulate the sensitivity and time constant of the circuit. An impedance-converting J-FET 35 is connected to, respectively, a supply voltage pin D and an output pin S. A ground or earth pin E is also disclosed in the circuit.

An advantage to this form of pyroelectric infrared detector is that no difference in output signal can be produced between both light-receiving electrodes 32 and 33. That is, the outputs from both light-receiving electrodes 32 and 33 and the circuit of FIG. 7(B) are connected to cancel each other when subject to ambient conditions. Thus, random noises can be eliminated because each of the light-receiving areas of these electrodes are equal to each other and will respond in a common manner to noises such as sunlight, internal lighting, vibration, and mechanical shock.

A problem exists, however, in the response characteristics of this type of pyroelectric infrared detector in that its sensitivity is dependent upon a particular movement or direction of the sensing target. These targets are disclosed, respectively, as vector symbols A, B, C, and D in FIG. 7(A).

Referring to FIG. 8, the output signal response associated with the movement of the person or target object from left to right (A direction), right to left (B direction), rear to front (C direction), and front to rear (D direction) is disclosed. A sensitivity orientation characteristic diagram corresponding to these measurements is plotted in FIG. 9. While a moving direction can be found under certain circumstances in FIG. 8, it can also be seen from FIG. 8 that a pyroelectric infrared detector of that configuration is hardly responsive to a moving body or person approaching in a corresponding angle of 90 degrees or 270 degrees. This is defined as the detection dead angle for this detector.

Referring to FIG. 9, the sensitivity orientation characteristic was obtained by applying infrared rays through a slit corresponding to the pyroelectric infrared detector at a pitch of 45 degrees and measuring an output voltage at that time, followed by converting the output voltage into a polar coordinate. Accordingly, with a pyroelectric detector of this configuration, it is not possible to accurately determine a moving body in certain predetermined sensing areas or to detect the moving direction of the moving body.

In order to address such requirements, a dual twin-type pyroelectric detector has been proposed, as shown in FIG. 10(A) o FIG. 10(A) shows a plan schematic view of the configuration of the light-receiving electrodes, wherein the pyroelectric member 41 is provided with two pairs of dual elements (i) and (ii) formed thereon. Thus, light-receiving electrodes 42, 43, 44, and 45 are connected, as shown in the electric circuit of FIG. 10(B). These light-receiving electrodes have a regular arcuate or arch shape about a common central point. These electrodes will output a signal on the plus side upon receiving infrared radiation on electrodes 42 and 44. Light-receiving electrodes 43 and 45 have a construction such that, upon receiving infrared radiation, the output will be on the minus side.

The light-receiving electrodes 42 and 43 have the same shape and the same area and are arranged to be symmetrical about a central point, and are also relatively close to each other to form a first dual element. The light-receiving elements 44 and 45 have both the same shape and light-receiving area, but are different from the light-receiving electrodes 42 and 43 in both shape and light-receiving area. Light-receiving electrodes 44 and 45 are likewise symmetrical about the same point and surround the light-receiving elements 42 and 43 to form the second dual element (ii). FIG. 10 discloses an electrical circuit schematic wherein high megohm load resistances 46 and 47 are provided, along with a pair of J-FET elements 48 and 49, which are capable of converting the input impedance. Supply voltage pins $D_i$ and $D_{ii}$, along with output pins $S_i$ and $S_{ii}$, are connected to the field effect transistors. Ground or earth pins are designated $E_i$ and $E_{ii}$.

An output response of a pyroelectric detector 41 is shown in FIG. 11. A sensitivity orientation characteristic diagram is further shown in FIG. 12, and was obtained in the same manner as that disclosed in FIG. 9. As can be seen by making a comparison of these drawings, the dual twin-type pyroelectric detector has improved detection characteristics when compared with the dual-type pyroelectric infrared detector shown in FIG. 7.

Referring, however, to FIG. 11, the output of the dual electrodes is charted with regard to the moving direction shown by the vectors A, B, C, D, E, and F in FIG. 10(A). Thus, no output can be obtained in certain moving directions of the moving body, and sensitivity is greatly dependent upon the moving body direction. In particular, the sensitivity in the inclined direction shown by arrows E and F in FIG. 10 is deteriorated (see the chart of FIG. 12).

As shown in FIG. 11, the first dual electrode (i) is different from the second dual electrode (ii) in output form, since they are unbalanced sensing electrodes and they are not symmetric around the center of rotation to each other. Thus, the common mode noises due to disturbances, such as strong visible light, mechanical vibration, shock, etc., cannot be completely cancelled. This occurs because, for example, when external vibration and shock acts upon the first and second dual elements (i), (ii), the first dual element (i) is different from the second dual element (ii) in vibration characteristics. Thus, the pyroelectric output can be different in an absolute value between the first dual element (i) and the second dual element (ii). Therefore, they are not able to be directly offset. Additionally, if visible light is designed to be cut off, but a portion of a strong visible light comes through a multilayered interference filter (not shown) which has been provided for transmitting only infrared radiation from the target region, a difference in radiation can be produced between those dual elements (i) and (ii), which are asymmetric to each other.

The prior art has recently required expanding a sensing area to additionally include a position immediately below the pyroelectric infrared detector. These pyroelectric infrared detectors are being subject to utilization in environments having a large number of noise sources, such as various kinds of lighting, acoustic machines, tools, etc. Accordingly, there has been a desire to provide a pyroelectric infrared detector capable of eliminating the noises of a common mode due to visible rays, vibration, shock, and the like while addressing the problem of the dead angle detection regions that have existed in the prior art. Such a pyroelectric infrared detector, however, must still be capable of detecting the moving direction of a moving body in an economical manner.

SUMMARY OF THE INVENTION

It is an object of the present invention to provide a useful pyroelectric detector capable of cancelling noises of a common mode, eliminating detection dead angles, and accurately detecting a moving direction of a moving body.

In order to achieve the above-described object, four light-receiving elements having the same L-shape, of light-sensing electrodes and light-receiving sensitivity, are formed on a surface of a pyroelectric member in an L-shaped with a curvilinear form, symmetrically arranged around a central axis, each electrode offset by 90 degrees from the adjacent electrode and each electrode overlapping the adjacent electrode by about 90 degrees. The four sensing electrodes form two pairs of dual elements so that a common output signal may be taken out from the respective dual elements.

According to the above-described construction, two pairs of dual elements have the same construction, so that noises of a common mode can be cancelled. The respective light-receiving elements of the two pairs of dual elements have the same L-shape, orientation light-receiving area, and light-receiving sensitivity and are arranged symmetrically around a center of rotation with the L-shaped electrodes configured so each covers about 180 degrees, thereby allowing each electrode to overlap the next electrode by about 90 degrees. A moving body can be almost uniformly sensed even though it approaches from any direction. Thus, the so-called detection dead angle is not generated. In addition, since an output, which will change, depending upon the direction in which the moving body is moved, is obtained, the moving body can be accurately detected.

The invention includes a pyroelectric detector having a substrate with four sensing electrodes of an identical configuration, symmetrically arranged about a central axis, the boundaries of the electrode configuration varying in radius from the central axis to provide an irregular configuration, with each configuration being out of phase by 90 degrees from the adjacent electrode. The two pairs of electrodes are connected to a circuit for processing the outputs of the respective pairs of electrodes.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a pyroelectric infrared detector with an improved sensing element of a unique shape.

The preferred embodiments of the present invention will be described below with reference to the drawings.

Figure 1A:
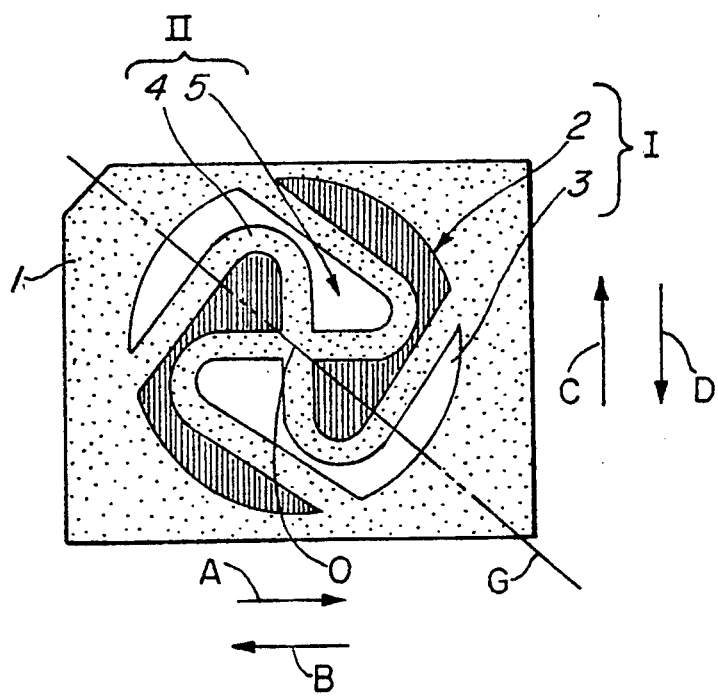
FIG. 1(A) is a top plan view schematically showing a construction of a light-receiving surface of a pyroelectric detector according to a first preferred embodiment of the present invention.
Figure 1B:
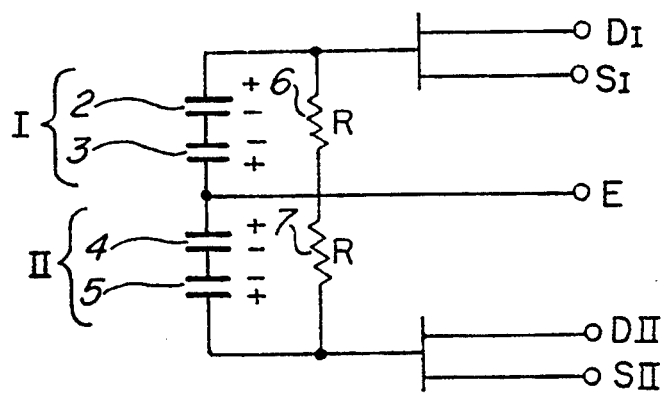
FIG. 1(B) is a diagram showing an internal electric circuit schematic.

FIGS. 1(A) and 1(B) show a pyroelectric infrared detector according to a first preferred embodiment of the present invention. FIG. 1(A) is a diagram showing a plan view of the configuration of the sensing electrodes. FIG. 1(B) is a drawing showing an electrical circuit for the first embodiment.

Referring to FIG. I(A), a pyroelectric member 1 having a spontaneous polarization is made of ferroelectric ceramics or crystals, such as PZT and $LiTaO_3$, and is formed in a pellet-like shape. For example, two pairs I and II of dual sensing elements (hereinafter referred to as a first dual element I and a second dual element II) having an identical construction are formed on a surface of the pyroelectric member 1.

The four sensing electrodes 2, 3, 4, and 5 can be formed by a vapor deposition coating or by sputtering metals, such as Cr, Ni, Al, and Ni—Cr, on the surface of the pyroelectric member 1. Each of the sensing electrodes 2 to 5 have the same basic shape, area, and sensitivity, but are different by 90 degrees in phase, respectively. They are formed in an L-shape and are spaced from one another and arranged to be symmetric around a center of rotation or central axis "O." The light-receiving elements 2 and 4 are provided with an electrode constructed so as to provide an output on the plus side when receiving infrared rays, while the sensing electrodes 3 and 5 are provided with an electrode so as to provide an output on the minus side when receiving infrared radiation. One arm of each L-shaped electrode extends in a curvilinear fashion along the circumference of an imaginary circle traced around the central axis with a second arm at right angles to the first forming a tangent to a smaller imaginary circle traced around the central axis. The circumferential arms extend in the same direction about the circle and each electrode stretches about 180 degrees from end to end. Thus, each electrode overlaps the next electrode by about 90 degrees.

The sensing electrodes 2 to 5 are connected as shown in FIG. 1(B), with the sensing electrodes 2, 3 forming a first dual element I, and the sensing electrodes 4, 5 forming a second dual element II. In addition, high megohm load resistors 6, 7 and J-FETs 8, 9, which convert the input impedance, are connected with the first and second dual elements I and II, respectively, so as to individually provide an output. Furthermore, referring to FIG. 1(B), reference mark R designates gate bias resistors, reference mark D designates a supply voltage pin with $D_i$ and $D_{ii}$ representing the supply pins for elements I and II, respectively, reference mark S designates an output pin with $S_i$ and $S_{ii}$ representing the output pins for elements I and II, respectively, and reference mark E designates an earth pin or ground.

In this preferred embodiment, the adjacent two pairs of sensing electrodes 2, 3 and 4, 5 form the first and second dual elements I and II, respectively, in combination so as to permit a signal to be output independently from each other. In addition, the infrared radiation from a moving body is incident upon both the first dual element I and the second dual element II through a multilayer interference filter (not shown) having a function of cutting off any visible lights which are not required to activate the first and second dual elements I and II.

In a pyroelectric detector having the abovedescribed construction, the sensing electrodes 2 to 5 have equal output for extrinsic vibration or ambient conditions. Thus, pyroelectric outputs having an equal absolute value are generated in the respective sensing electrodes 2 to 5 to be offset in the respective first and second dual elements I and II, even in the presence of vibration and shock. In addition, even though strong visible light may leak through the multilayer interference filter, the amount of radiation received by the respective sensing electrodes 2 to 5 is equal, so that no difference is produced between the output in the first dual element I and in the second dual element II; that is, they are offset. The noises of a common mode can be effectively cancelled in the above-described manner.

Figure 2:
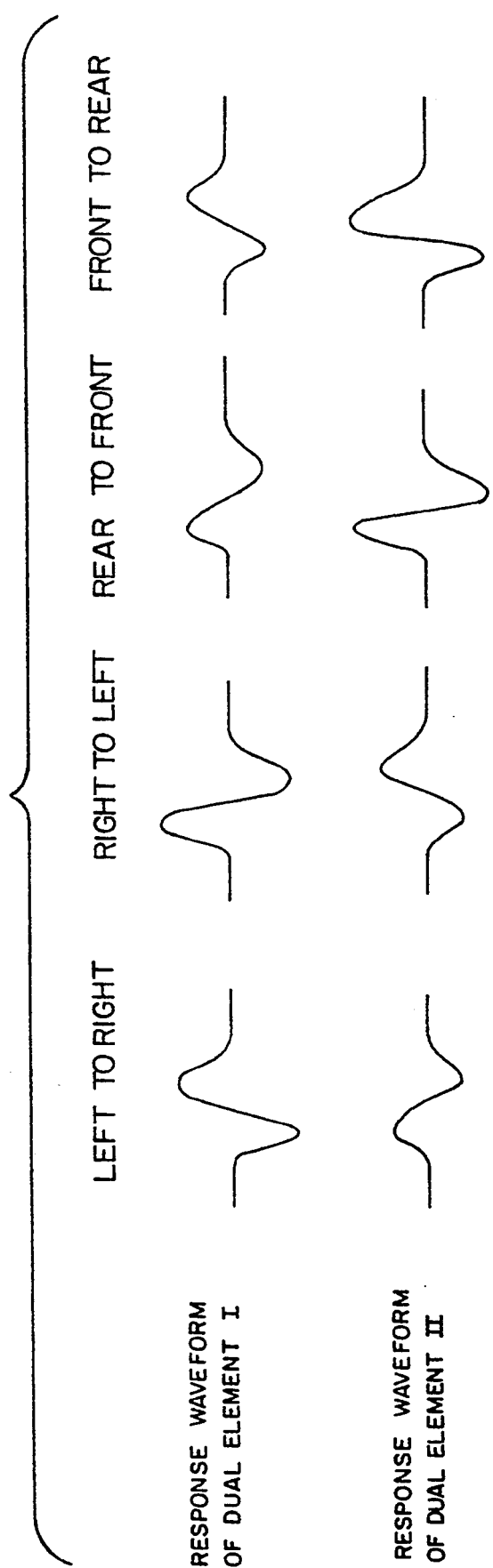
FIG. 2 is a diagram showing a response waveform of a dual element-type pyroelectric detector.
Figure 3:
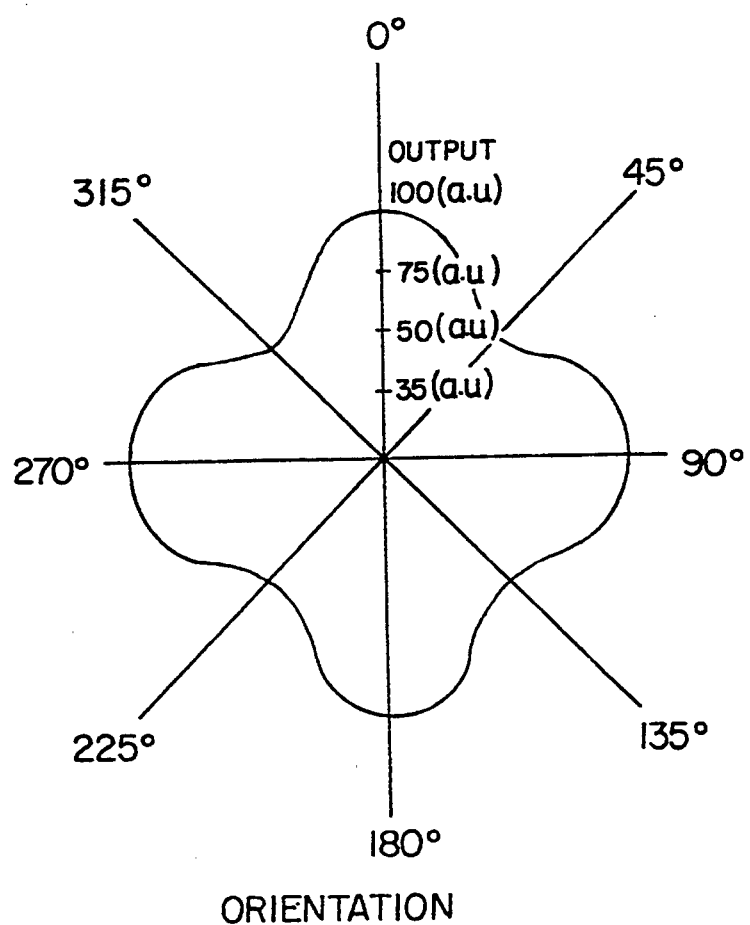
FIG. 3 is a sensitivity orientation characteristic diagram of the pyroelectric detector.

The respective sensing electrodes 2 to 5 are overlapping, identically L-shaped and identically sized so that they are different by 90 degrees in phase, respectively, while still being symmetric around the center of rotation (0). Thus, a difference is inevitably produced between the amount of infrared radiation incident upon the sensing electrode 2 and that incident upon the sensing electrode 3 in the first dual element I and between the amount of infrared radiation incident upon the sensing electrode 4 and that incident upon the sensing electrode 5 in the second dual element II, respectively, even though the moving body may approach from any direction. Such a difference can be detected as a differential output. In a case where, for example, the sensing area is crossed by a moving body in four directions (right-to-left, left-to-right, front-to-rear, and rear-to-front), as shown by the vector arrows A, B, C, and D in FIG. 1, a response waveform as shown in FIG. 2, and the sensitivity orientation characteristic diagram as shown in FIG. 3 are obtained. As can be seen from these drawings, the pyroelectric detector according to this preferred embodiment has no detection dead angles.

Again referring to FIG. 2, the response waveform in the first dual element I (II) in the case where the sensing area is crossed by a person in a left-to-right direction or a front-to-rear direction is opposite to that in the case where the sensing area is crossed by the person in a right-to-left direction or a rear-to-front direction. Thus, a pattern of the response waveform is inverted with a broken line G (diagonal line) in FIG. 1 as a boundary. Accordingly, the moving direction of the moving body can be discriminated in two directions, that is, the front-to-rear direction or the left-to-right direction, by investigating for the existence of specific patterns of these two waveforms.

Figure 4:
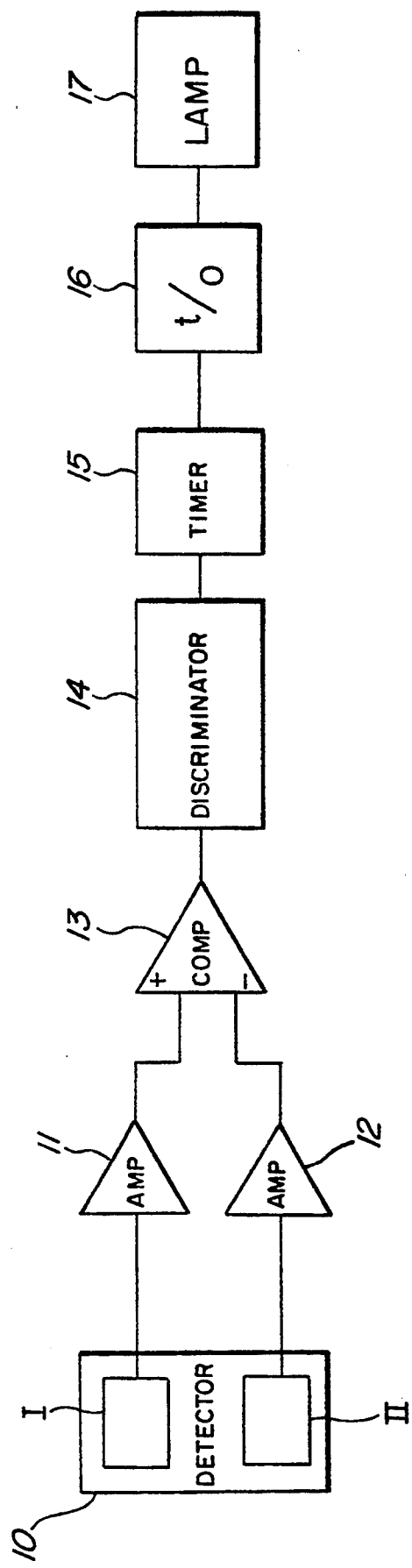
FIG. 4 is a schematic block chart of a lighting control system using the pyroelectric detector.

FIG. 4 is a diagram schematically showing a construction of a sensor for a light control in, for example, a toilet room, by the use of the above-described pyroelectric detector according to the present invention. Referring to FIG. 4, reference numeral 10 designates a pyroelectric detector, reference numerals 11 and 12 designate amplifiers for the output from the first and second dual elements I and II, respectively, reference numeral 13 designates a subtracting circuit, reference numeral 14 designates a discriminating circuit, reference numeral 15 designates a timer circuit, reference numeral 16 designates an output circuit, and reference numeral 17 designates a lighting lamp. According to this construction, the moving direction of the person can be detected by means of the pyroelectric detector 10. Accordingly, a lighting time period of the lighting lamp 17 can be lengthened or activated when a person entering the toilet room is sensed, while the lighting time period of the lighting lamp 17 can be shortened or expired when a person leaving the toilet room is sensed.

Thus, accurate use of lighting energy can be accomplished.

When a person enters the toilet room, the relative outputs of the first and second dual elements I and II are appropriate amplified by the amplifiers 11, and then subjected to a subtracting or comparison circuit 13. The output from the circuit 13 can be discriminated to determine, in the discriminating circuit 14, whether a person is entering or leaving the room. Based on this information, a timer circuit can initiate, shorten, lengthen, or expire a predetermined time period. An output circuit or drive circuit can respond to this time period to drive the lighting lamp 17 accordingly.

Figure 5A:
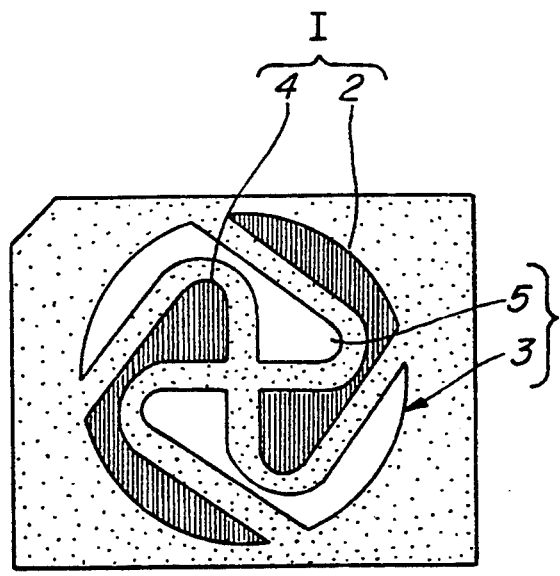
FIG. 5(A) is a top plan view schematically showing a construction of sensing electrodes of a pyroelectric detector according to a second preferred embodiment of the present invention.
Figure 5B:
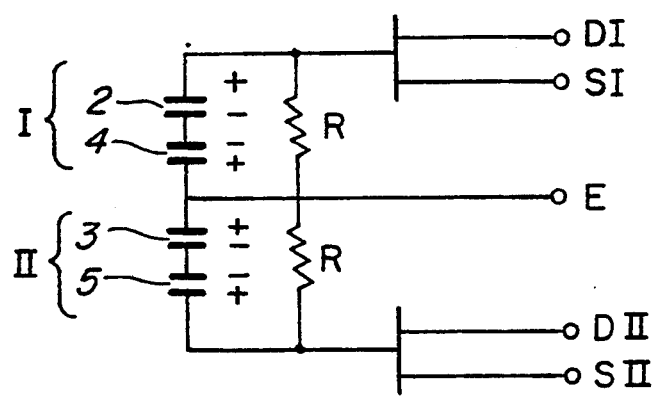
FIG. 5(B) is a diagram showing a schematic electrical circuit.
Figure 6:
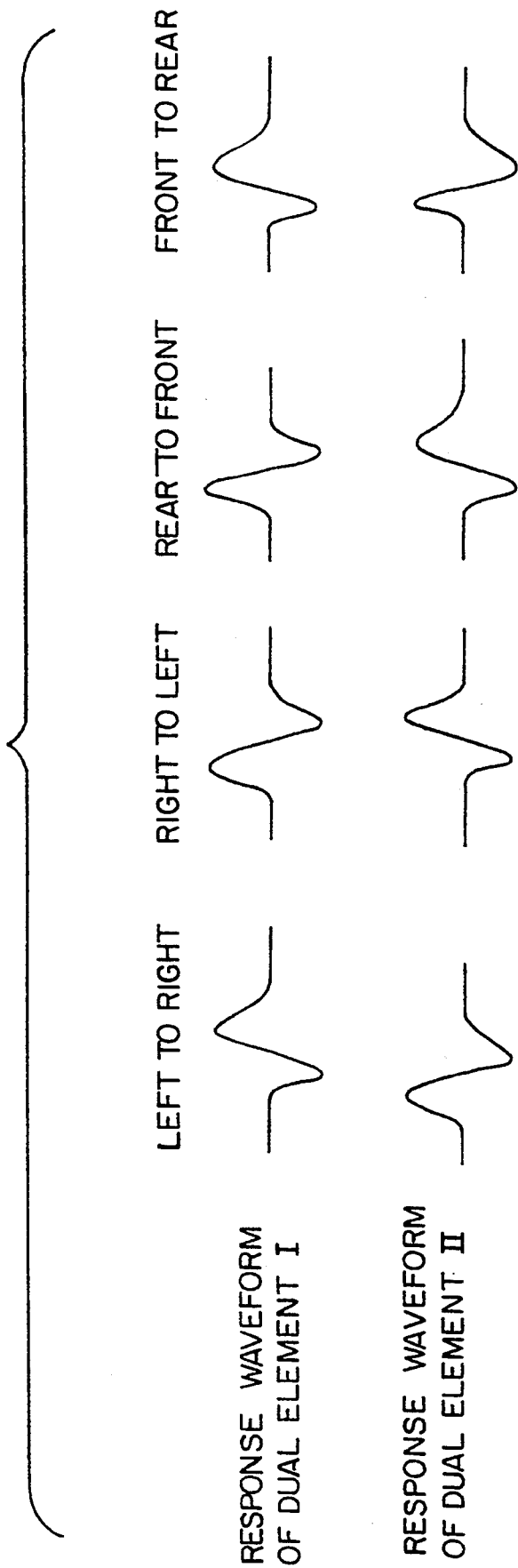
FIG. 6 is a diagram showing a response output of a dual element in the pyroelectric detector.
Figure 7A:
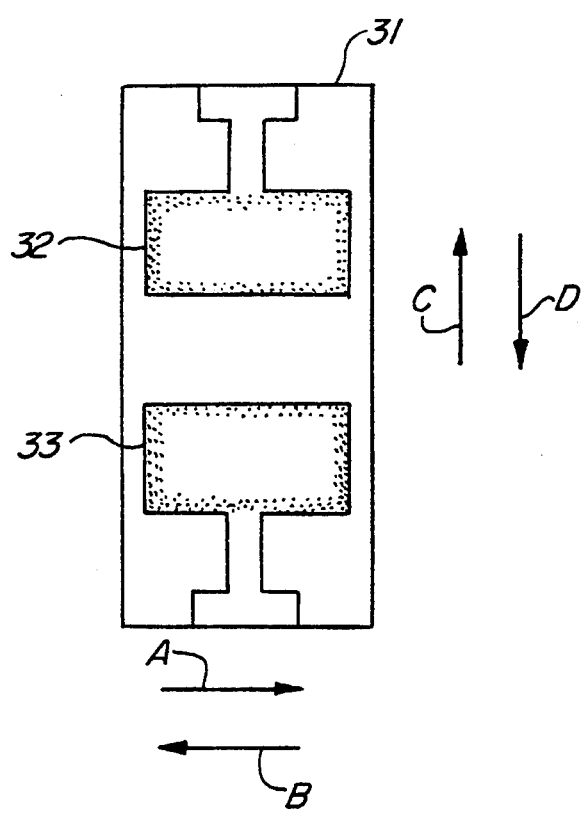
FIG. 7(A) is a top plan view showing a construction of sensing electrodes of the conventional pyroelectric detector.
Figure 7B:
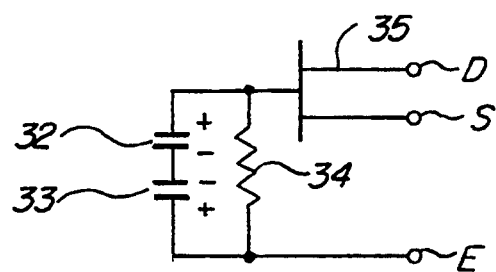
FIG. 7(B) is a schematic diagram showing an electrical circuit.
Figure 8:
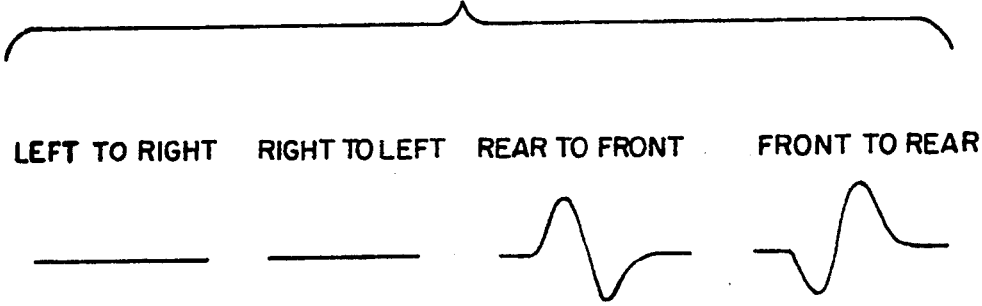
FIG. 8 is a diagram showing a response waveform of a conventional dual element-type pyroelectric detector.
Figure 9:
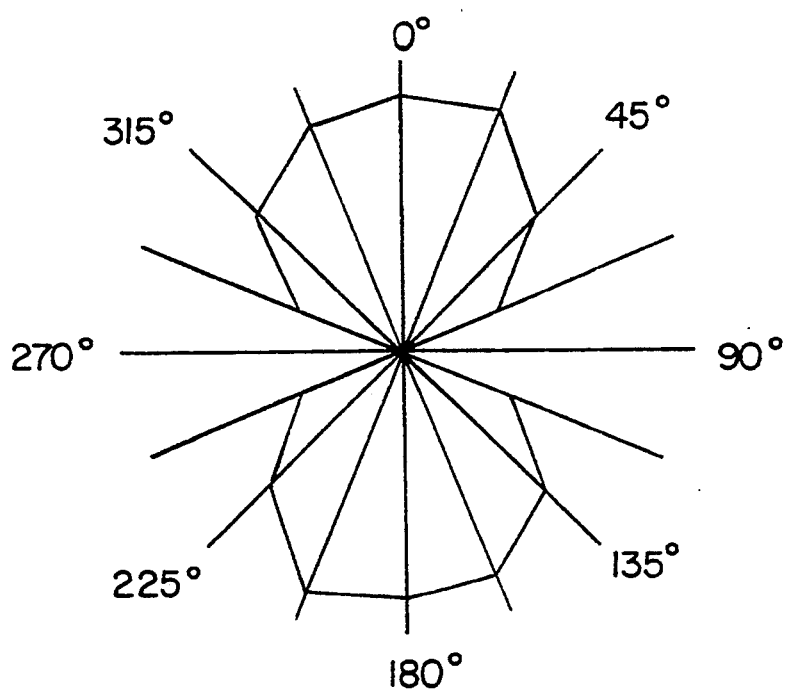
FIG. 9 is a sensitivity orientation characteristic diagram of the conventional pyroelectric detector.
Figure 10A:
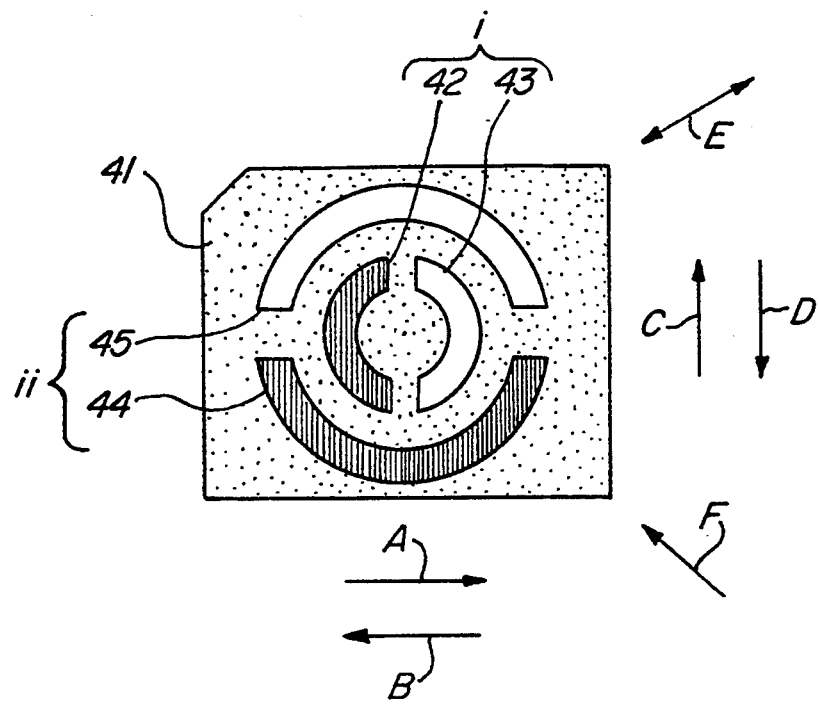
FIG. 10(A) is a top plan view showing a construction of a sensing electrodes of another conventional pyroelectric detector.
Figure 10B:
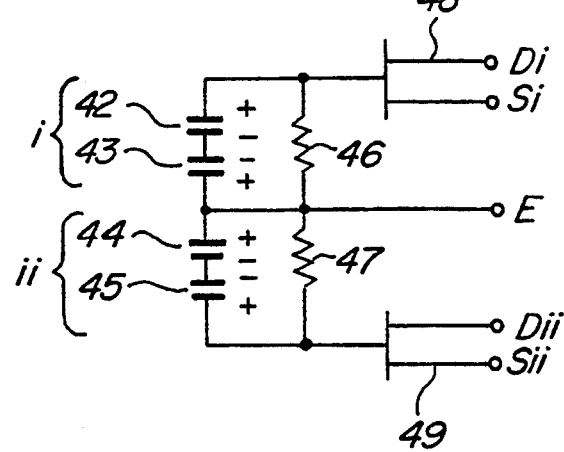
FIG. 10(B) is a diagram showing an internal electrical circuit schematic of another conventional pyroelectric detector.
Figure 11:
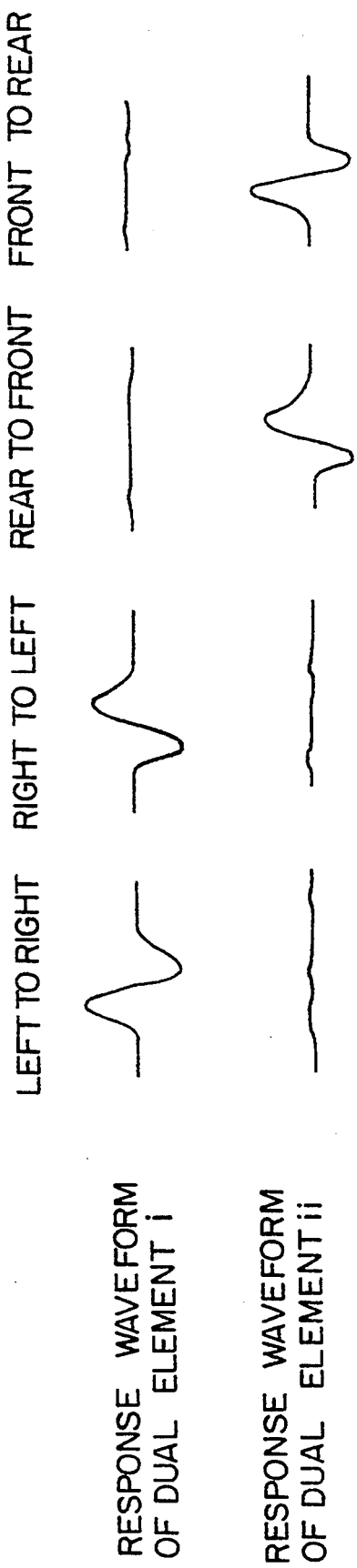
FIG. 11 is a diagram showing a response waveform of a dual element in another conventional dual element-type pyroelectric detector.
Figure 12:
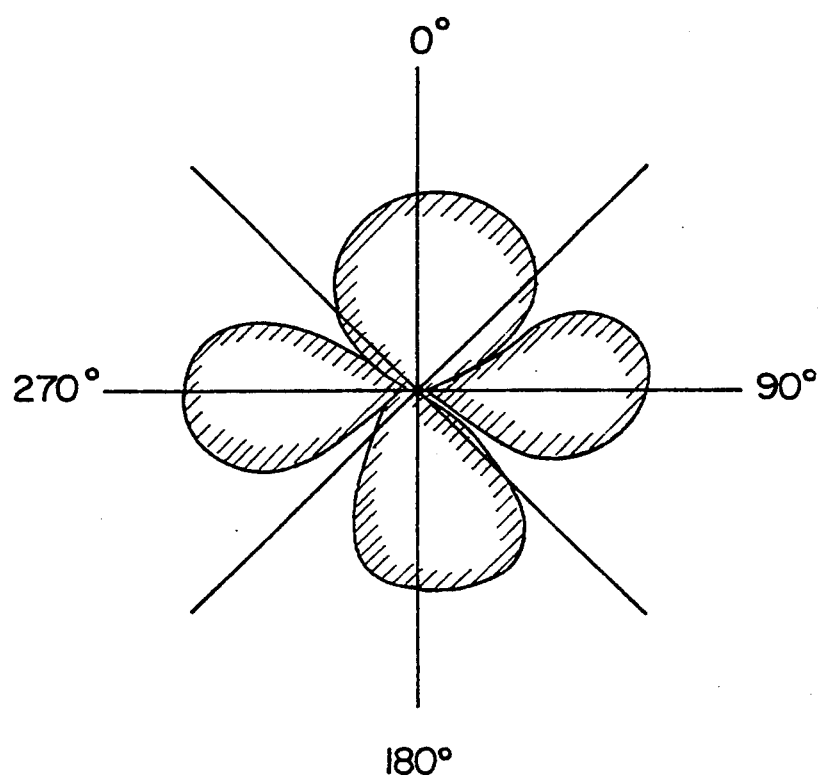
FIG. 12 is a sensitivity orientation characteristic diagram of another conventional pyroelectric infrared detector.

FIG. 5 shows a pyroelectric detector according to a second preferred embodiment of the present invention. In this preferred embodiment, as shown in FIG. 5(A), the sensing electrodes 2 and 4 and the sensing electrodes 3 and 5 are arranged opposite to each other (different by 180 degrees in phase), respectively, and form the first dual element I and the second dual element II, respectively. The electric circuit in this case is shown in FIG. 5(B). The response waveforms of the first and second dual elements I and II in the pyroelectric detector according to this preferred embodiment are shown in FIG. 6. With a pyroelectric detector having such a construction, the moving direction of the moving body can be discriminated in four directions (left-to-right, right-to-left, front-to-rear, and rear-to-front).

As described above, according to the present invention, noises of a common ambient mode due to visible lights, mechanical vibration, shock, and the like can be effectively eliminated, the approach of a moving body from any direction is capable of being detected, and the moving direction of the moving body is also accurately detected.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A pyroelectric detector comprising:
   a substrate;
   four L-shaped sensing electrodes on the substrate, being of an identical configuration symmetrically arranged about a central axis, with each electrode offset 90 degrees around the central axis from the adjacent electrode, the sensing electrode comprising:
   a first electrode arm with an end of the arm disposed on a first imaginary circle traced about the central axis with the first arm forming a tangent to the first circle; and
   a second electrode arm lying substantially along a circumference of a second imaginary circle traced about the central axis, the circle having a longer radius than the first circle, and with an end of the second arm being displaced about 180 degrees from the end of the first arm;
   so that each electrode overlaps the adjacent electrode by about 90 degrees as measured along the second circle;
   means for connecting two pairs of electrodes; and
   means for processing the outputs of the respective pairs of electrodes.

2. The detector of claim 1, wherein the end of the first arm is enlarged in the approximate shape of an equilateral triangle with a vertex pointing towards the central axis.

3. The detector of claim 1, wherein an edge of the second arm disposed away from the central axis forms a curved line that falls along the circumference of the second circle and an edge of the second arm disposed towards the central axis forms a substantially straight line parallel to an edge of the first arm of the adjacent electrode.

4. A pyroelectric detector comprising:
   a substrate;
   four L-shaped sensing electrodes on the substrate, being of an identical configuration symmetrically arranged about a central axis, with each electrode offset 90 degrees around the central axis from the adjacent electrode, the sensing electrode comprising:
   a first electrode arm with an end of the arm disposed on a first imaginary circle traced about the central axis with the first arm forming a tangent to the first circle, the end enlarged in the approximate shape of an equilateral triangle with a vertex pointing towards the central axis; and
   a second electrode arm lying substantially along a circumference of a second imaginary circle traced about the central axis, the circle having a longer radius than the first circle, with an edge of the arm disposed away from the central axis being curved to follow the circumference, with an edge of the arm disposed towards the central axis forming a substantially straight line parallel to an edge of the first arm of the adjacent electrode, and with an end of the second arm being displaced
   about 180 degrees from the end of the first arm; so that each electrode overlaps the adjacent electrode by about 90 degrees as measured along the second circle;
   means for connecting two pairs of electrodes; and
   means for processing the outputs of the respective pairs of electrodes.

5. In a pyroelectric detector for determining the presence and direction of objects emitting infrared radiation, the improvement of a detector element comprising:
   a substrate; and
   four L-shaped sensing electrodes on the substrate, being of an identical configuration symmetrically arranged about a central axis, with each electrode offset 90 degrees around the central axis from the adjacent electrode, the sensing electrode comprising:
   a first electrode arm with an end of the arm disposed on a first imaginary circle traced about the central axis with the first arm forming a tangent to the first circle; and
   a second electrode arm lying substantially along a circumference of a second imaginary circle traced about the central axis, the circle having a longer radius than the first circle, and with an end of the second arm being displaced about 180 degrees from the end of the first arm;
   so that each electrode overlaps the adjacent electrode by about 90 degrees as measured along the second circle.

6. The detector of claim 5, wherein the end of the first arm is enlarged in the approximate shape of an equilateral triangle with a vertex pointing towards the central axis.

7. The detector of claim 5, wherein an edge of the second arm disposed away from the central axis forms a curved line that falls along the circumference of the second circle and an edge of the second arm disposed towards the central axis forms a substantially straight line parallel to an edge of the first arm of the adjacent electrode.

* * * * *